Feb. 6, 1934.    H. R. STRAIGHT    1,946,367
AUTOMOBILE RUBBER TIRE TREAD CONSTRUCTION
Filed May 11, 1932    2 Sheets-Sheet 1

Inventor
Halen R. Straight

Feb. 6, 1934.    H. R. STRAIGHT    1,946,367
AUTOMOBILE RUBBER TIRE TREAD CONSTRUCTION
Filed May 11, 1932    2 Sheets-Sheet 2

Inventor
Halver R. Straight.

Patented Feb. 6, 1934

1,946,367

UNITED STATES PATENT OFFICE 1,946,367

AUTOMOBILE RUBBER TIRE TREAD CONSTRUCTION

Halver R. Straight, Adel, Iowa

Application May 11, 1932. Serial No. 610,598

9 Claims. (Cl. 152—14)

The object of my invention is to refine tire tread construction so as to improve the cooling of the tire in use by so constructing the tread blocks that a decreasing thickness of the surface film of comparatively quiet air next to the tire surface will occur so that the temperature of the tire is held within limits that are lower than would otherwise be possible in warm weather.

A further object of my invention is to provide an improved tire tread whereby noises incident to operation of tires are reduced by reducing turbulence of the surrounding air.

A further object of my invention is to provide an improved tire tread construction whereby the noises of tread contact are reduced by arranging the initial contacts of the tire blocks so that contact of the blocks will occur at different times, thereby cutting down the volume of noise and decreasing the amplitude of any mixed air vibration set up.

A further object of my invention is to provide an improved tire tread in which the power required to roll the tire ahead under load is reduced. This may be accomplished in three distinct ways. First, by reducing turbulence in general the total head resistance is decreased; second, by increasing flexibility upon contacting the road to decrease power as needed to roll the tire ahead; and third by reducing the force required to push the tire ahead to overcome the suction under the tire, as the tire rolls ahead on the road, power is saved.

A further object of my invention is to provide means for balancing the wear on the tire tread block where used by providing equal areas of surfaces without staggering for carrying equal loads on each side of the center of the tire, and at the same time permit the forward ends of the blocks to engage the road in a successive manner to reducing noise.

For the purpose of assisting in an understanding of my invention, I show in the accompanying illustrations an arrangement of the tire tread block sections with the depressions or grooves between them through which a part of the air moving relative to the tire circulates.

For the purpose of illustration it is not necessary to show a complete tire tread for the tread blocks are duplicated over a short length of the tire tread running around it and being reversible the illustration shown will clearly show my idea.

My invention consists in the construction, arrangement and combination of the various parts of the device, whereby the objects contemplated are attained, as hereinafter more fully set forth, pointed out in my claims, and illustrated in the accompanying drawings, in which:

Figure 1:
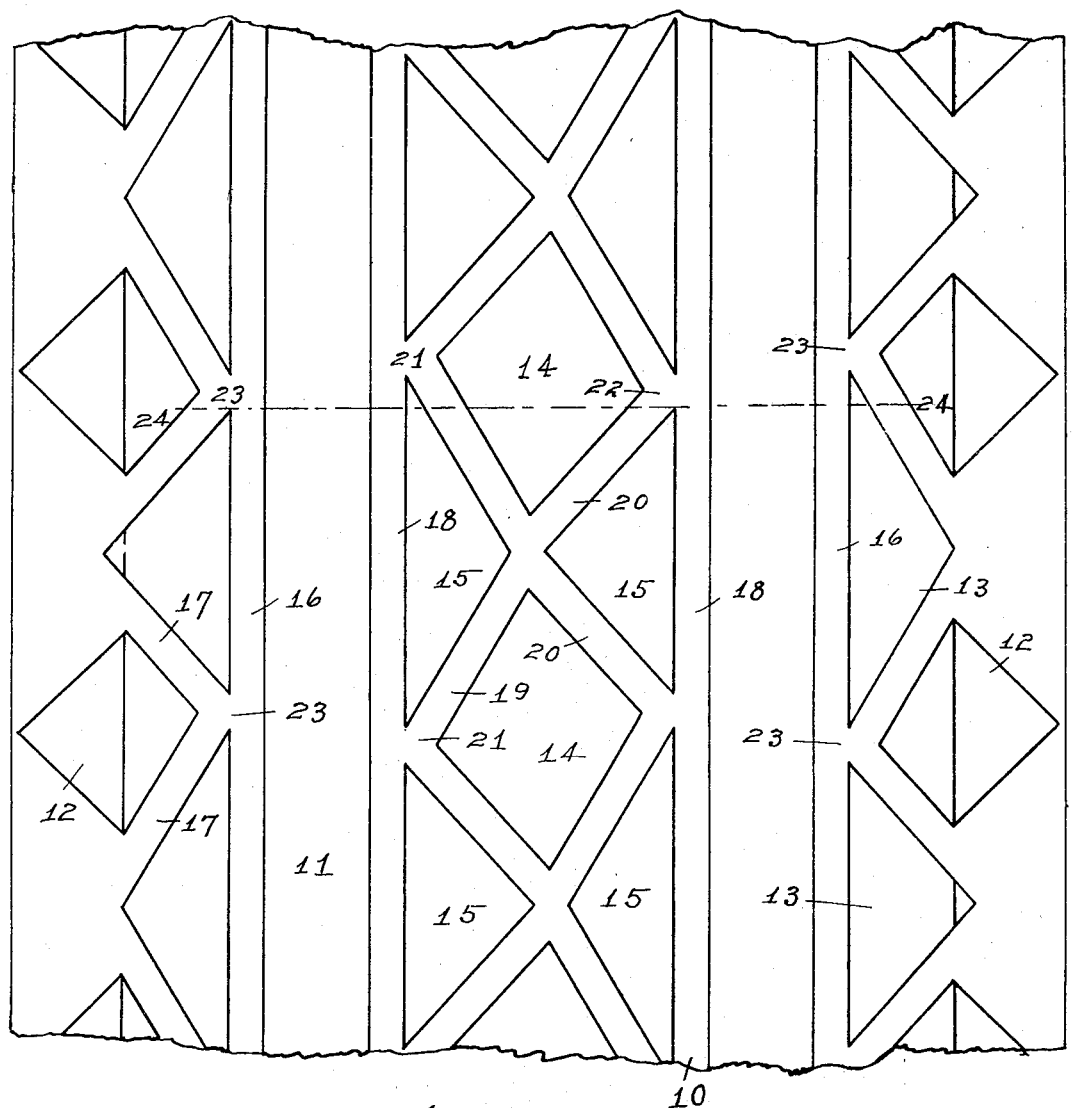
Figure 1 is a diagrammatical view of the tread surface of a pneumatic tire to more clearly illustrate the size of the respective tread blocks, and also the angle of the grooves formed between the blocks, one relative to the other and to the circumferential ribs.

Referring to the accompanying drawings, I have used the reference numeral 10 to indicate the tread body, the outer surface of which is provided with a series of circumferential ribs 11 and a circumferential row of side lugs 12. Between the row of lugs 12 and the ribs 11 is a row of tread blocks 13 arranged in staggered relation to the lugs 12. Supported between the ribs 11 is a central circumferential row of tread blocks 14, and between the row of blocks 14 and each of the ribs 11 is a row of blocks 15. The blocks 15 are arranged in transverse pairs and alternately with the blocks 14, as clearly illustrated.

The blocks are first laid out in the manner illustrated in Figure 1, to more easily obtain the proper balance in the shape and arrangement of the blocks, and the desired angles of the grooves between the blocks. It will be seen that a circumferential groove 16 is formed between each row of blocks 13 and the adjacent rib 11 while angular or inclined grooves 17 are formed between the blocks 13 and the adjacent lugs 12, the grooves 17 connecting the grooves 16.

A circumferential groove 18 is formed between the outer side face of the blocks 15 and the inner side faces of the ribs 11, while angular grooves 19 and 20 are formed between the blocks 14 and 15, the last grooves connecting with each other and with the grooves 18.

The contact or tread areas of all the blocks 14 being the same, although the shape of the alternate blocks is somewhat different from the shape of the intermediate blocks. The blocks 15 are arranged in transverse pairs, and have the areas of their tread faces substantially equal. It will be seen, however, that the circumferential length of one block 15 is greater than the circumferential length of the other block 15 of said pair, while the transverse width of the first block is less than the transverse width of the second block, whereby the forward corners of the longer block will engage the ground surface ahead of the forward corner of the shorter block, the rear corner of the shorter block leaving the road surface ahead of the rear corner of the longer block, to reduce noise and increase traction in a manner hereinafter more clearly set forth, the wearing surface of both blocks being the same.

It will further be seen that the blocks 13 are also arranged in transverse pairs, one of the blocks of each pair being longer than the other, while the shorter blocks are wider than the longer blocks both blocks being of equal areas to further eliminate noise in the manner as above described. The longer blocks of the alternate pairs of blocks are on the opposite side from the longer blocks of the intermediate pairs of blocks as applied to both sets of blocks 13 and 15.

It will further be seen that the forward weirs 21 of the end of the grooves 19 will make contact with the road surface ahead of the forward weirs 22 of the grooves 20, while the rearward weirs 22 will leave the ground surface ahead of the rear weirs 21.

In a like manner the forward weirs 23 of the grooves 17 on one side of the tire will leave the ground surface ahead of the corresponding weir 23 on the opposite side of the tire tread, due to alternate arrangements of the long and short blocks 13, the dotted line 24—24 being drawn perpendicularly across the tire, as illustrated in Figure 1, to assist in comparing the relative positions of the forward points of the blocks 13 and 15.

Figure 2:
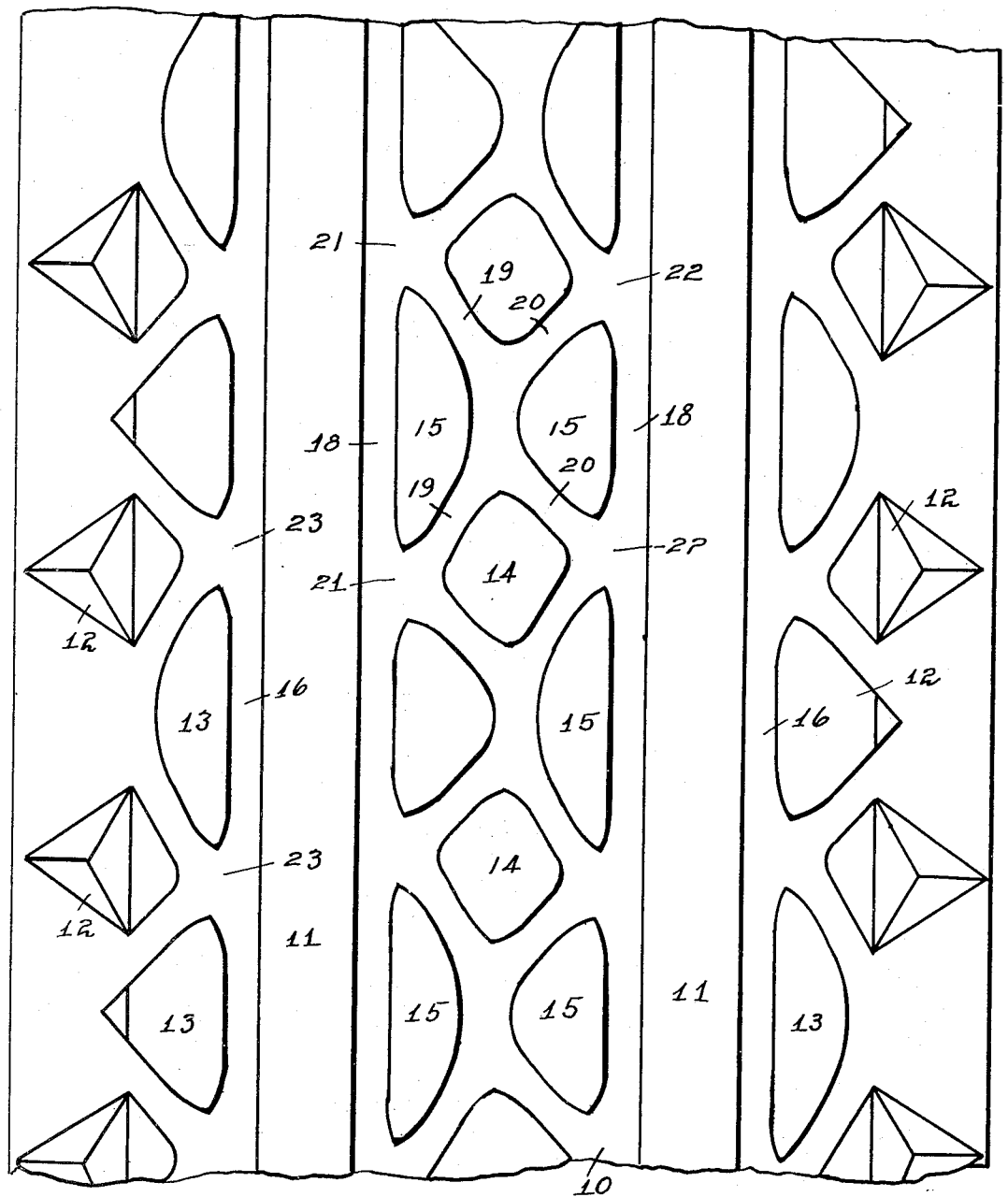
Figure 2 is a plan view of a tire tread constructed to carry out my invention, the tread being flattened out rather than curved as in actual construction.

The description so far being more particularly to the diagram illustrated in Figure 1. The side walls of the grooves 16, 17, 18, 19 and 20 are parallel in the same manner as the grooves between the blocks of tires now in commercial use, the intersecting side faces of the blocks forming sharp or pointed corners, offering great resistance to the passage of air currents through said grooves, in a manner hereinafter more clearly set forth. To overcome this objection I formed the blocks as illustrated in Figure 1, with rounded corners, as illustrated in Figure 2, whereby the grooves will have enlarged mouths or weirs so that the side walls of said grooves will be contracted to the center.

The operation and advantages of my improved construction will now be set forth.

It will be seen that my object is to improve the shape of the groove so as to form a section much like a split Venturi tube which is capable of building up a negative static pressure within the tube which will tend to feed in more air for cooling the tire than would ever come in close to the tire surface with sharp intake ends on the grooves. My improvement therefore allows the velocity head of the air relative to the moving tire to greatly improve the cooling of the tire.

It is a well known fact that the rubber of the tread and tube of a tire is reduced in strength as the temperature increases. Bureau of Standards tests show there is approximately a six per cent decrease in the tensile strength of such rubber for every 10° C. increase in temperature within limits found in summer operation. This decrease in strength allows more chance for picking up sharp objects causing punctures and tends to weaken allowing blowouts and other tire failures. An increase in tire temperature causes increased pressure of the air within the tire resulting in greater inflation air leakage because of the increased pressure, thereby making necessary more attention to inflations. Tires that become excessively heated in use are less resilient, for the expansion of air within increases the pressure above that best adapted for maximum comfort in riding.

One of the objects of my improved tire tread design is to improve the air cooling of the tire by reducing the frictional resistance of the air in passing down the length of the groove and thereby increasing the mass of air flowing in the groove. Since the cooling of any body is dependent upon the mass of cooling media passing the body, it is easily understood how a lower temperature condition within the tire may be brought about.

The better cooling of my tire may be stated as follows: A rounded edge design in a weir reduces turbulence of the fluid flowing and increases the mass flowing in a unit time because of less eddy currents set up next to the sides of the intake, which eddy currents reduce the contraction coefficient. Treating the groove of a tire as a weir, the proper rounding of the edge or edges at the intake increases the contraction coefficient to almost unity as compared to a coefficient of .60 to .70 with all edges sharp. Because of the reduction of eddy currents in a groove with rounded edges of intake, the film thickness of comparatively quiet air is reduced by the more intimate flowing air at higher velocity, thereby improving the "wiping" effect of the air on the surface being passed.

My improved design allows the velocity head of the air passing down the sides of the tire due to the velocity of the tire through the air to not only cause closer sweeping of the air within the grooves, because of the improved groove design, but also allows smoother and closer sweeping of the air to the smooth tread surfaces between the grooves as well as to the smooth surfaces nearer the rim between the rim and the tread blocks.

It is certain that any influence that reduces turbulence within the grooves aids in a smoother flow outside and beyond the groove, and thereby improves the freedom with which the tire as a whole moves through the air. This smoother operation relative to the moving air improves the overall cooling of the tire as well as increases the heat dissipated from the rim on which the tire is mounted and also slightly decreases, by generally reduced turbulence, the power required to push the tire ahead.

A great advantage is secured in a more quiet running tire by reducing the whistling or turbulence of the air at the intake of the groove as the tire rolls ahead on the ground. The drawing in of the air as the groove opens after contact with the road causes the vacuum formed within the groove to pull the air in rapidly and if drawn in past a sharp edged inlet will cause more tire noise than if the inlet edges are rounded. The expelling of the air as the tire flattens and as the grooves are collapsed after the tire blocks on each side of the groove have contacted the road also causes a noise if the expulsion of the air is past a sharp edge as in the old willow whistle. The rounding of the discharge edge is advantageous therefore in quieting the operation of the tire.

In order to further reduce the noise of the tire in operation, the points of the tire tread blocks are arranged in such a manner that they initially contact the road at different times to increase the frequency of the air vibrations and decrease their amplitude. The outer boundary line of the flattened tire surface on the road approximates an elliptical shape. The tire blocks on each side of the center of the tire tread are in general in pairs and if of the same size and symmetrically placed, will contact the road at the same time and increase the amplitude of vibrations.

As the tire is being flattened underneath as it is receiving the load, it is increased in flexibility by anything that will add to the freedom with which the air in the grooves can escape. In this case the less pressure required to expel the air, the more freely the grooves tend to collapse, and the less power required to roll the tire ahead under a unit load.

An average size tire of, say, 32" diameter rolling at 60 M. P. H. turns over approximately 660 R. P. M. or 11 R. P. S. The approximate length of road contact is 6" at inflation pressures recommended by tire manufacturers, and the time in which the air is expelled from the grooves is in 1/252 part of a second or thereabouts. It is seen that the movement of the air in the grooves now an orifice, when the groove has contacted the road, is therefore expelled so rapidly that the increase of the contraction coefficient of the groove in acting as an orifice will allow the escape of the air at lower pressure, because of reduced resistance.

Since the friction of the escaping air must be overcome by a force required to move the air and the force required is according to the square of the velocity, an improvement of 25% in the contraction coefficient of the groove between .60 and .85 acting as an orifice when in road contact, will nearly have the force required to clear the grooves of air. From this it seems that the shorter and the freer the path of the air in escaping from under the tire in the grooves, the more easily the tire will roll ahead and that this holds in proportion to the square of the velocity of the car. Therefore, a groove of the least practical angle from straight across the tire would be most desirable or conversely grooves parallel to the direction of rolling the tire, would be the least desirable.

One advantage of my improved design is to improve the traction a tire is capable of transmitting to the road per unit of load without slipping. When tread blocks are in pairs and symmetrically spaced on each side of the center line of the tread, there is a tendency to start the tire to bouncing on the road and it is a well known fact that once a tire bounces, slipping is more easily started and tractive effort is much reduced. When slipping is once started, static contact is changed to sliding contact and there is apparently a surface molecular rolling action with little adhesion between the contacting surfaces. Until normal pressure is restored, traction will not build up. There is a critical point where sliding starts and adhesion breaks down which may be induced by either applying power past the point where friction will prevent sliding, or by reducing weight and maintaining the same power. When a tire tends to bounce, no matter how little, a part of the weight is thrown off the tire momentarily and the critical point once passed breaks down the effection traction available very rapidly. By spacing the tire tread blocks so the contacting of the blocks is at more frequent intervals, the rolling action is smoother and the retarding ability of the tire per unit weight on the wheels increased.

Another advantage of my arrangement of pairs of blocks of equal surface area is to distribute the load per pair equally, thereby maintaining even wear without disturbing the balance of the tire.

Another advantage of my invention is to reduce the wasted power required to roll the tire ahead, because of the flattening of the tire. It is a well known fact that the vacuum cup design of tire tread required more power to roll it ahead per unit load on a pavement than a smooth tread, for the cups in adhering to the pavement required power which was wasted in breaking the suction of the cups as well as making excess noise. This same principle holds, in a lesser degree only, where there are grooves instead of cups on the tread. Therefore, the reducing of resistance with which the air flows into the grooves, reduces the power required to pull the tread away from a road surface for a collapsed groove receives and expels the air within it somewhat the same as a flattened cup on tire tread. My rounded intake ends on the grooves allow a freer flow of air inward as the tire rounds out to its normal shape, after having been flattened.

An advantage is gained in longer life, more dependability, less punctures, and more comfort is attained by reducing the turbulence between the tread blocks and around the tire resulting in a cooler running tire with more uniform inflation pressures. It is a well known fact that the drop of temperature within the surface film of the comparatively quiet gas next to a surface being cooled is quite abruptly downwardly at increasing distances away from the cooled surface, and any reduction of the thickness of this film reduces the temperature on the cooler surface of the body being cooled.

The heat generated in a tire by operation must pass through the surface film of comparatively quiet air next to the tire surface mostly by conduction but once having passed is carried away during operation by convection. It is a well known fact that the greater the thickness of the surface film, the less the heat conducting properties of the film, and the greater its insulating value. Once the heat has passed through the surface film, it is picked up by the moving air and carried away mechanically. Since air is a very poor conductor of heat, it will be easily understood how a more intimate wiping action increases cooling. Also higher velocity of air through the tire grooves, due to less resistance, gives greater mass of cooling air of increased temperature differential between the cooling air and the tire, and thinner surface film giving less insulation due to my improved design, and both or either will hold the temperature of the tire down.

The flow of air relative to the tire from approximately the wheel horizontal center line and below on the front side of the tire as in operation is from near the circumferential center outwardly in both directions at a constantly changing angle, and downwardly along the tire in a general direction of rotation. The flow of air above the center of the wheel is also outward in both directions but backward over the wheel as soon as the air velocity has overcome the friction drag of the tire surface.

The movement over the top tends to become nearly parallel to a plane through the wheel perpendicular to the axle. As the sweeping air approaches the top and bottom, the grooves in both directions from the center tend to receive the air more equally so the rounded intake of each groove tends to come more fully into effective use and the streamlining of the tire tread blocks cause them to more smoothly cut into the passing air.

I claim as my invention:

1. A pneumatic tire having its outer surface provided with spaced tread blocks of dissimilar shape and equal areas arranged in transverse pairs and located at substantially equal distances from the circumferential center of said tread and of such shape as to avoid simultaneous initial road contact as the tire is advanced over the road surface.

2. A pneumatic tire having its outer surface provided with outwardly projecting and spaced tread blocks of various shapes and of practically equal area so that successive blocks spaced at practically equal distances from the circumferential center of the tire tread are of different widths relative to each other for the purpose of reducing sound vibration.

3. A pneumatic tire having its outer surface provided with outwardly projecting and spaced tread blocks of various shapes and of practically equal area so arranged that successive blocks spaced at practically equal distances from the circumferential center of the tire tread are of different lengths relative to each other for the purpose of reducing sound vibration.

4. A pneumatic tire having its outer surface provided with a row of outwardly projecting and spaced tire tread blocks of various shapes and of practically equal areas arranged at substantially the same distances to one side of the circumferential center of the tire tread for the purpose of reducing sound vibration.

5. A pneumatic tire having its outer surface provided with a circumferential row of outwardly projecting tread blocks of substantially the same area and of various shapes, and so arranged that no successive circumferentially arranged blocks are of the same shape, for reducing sound vibrations.

6. A pneumatic tire having its outer surface provided with a circumferential row of outwardly projecting and equally spaced tread blocks, located at equal distances to one side of the circumferential center of the tire, said blocks being of substantially the same area and so constructed and arranged that no successive blocks are of the same shape, for the purpose of reducing sound vibrations.

7. A pneumatic tire having its outer surface provided with a circumferential tread portion provided with outwardly projecting tread blocks of equal area, the successive blocks circumferentially being of different shapes and so arranged that the sum of the areas of all the blocks of a transverse circumferential segment of the tread will be equal to the sum of the areas of the tread blocks of any other transverse circumferential segment of the same size.

8. A pneumatic tire having its outer surface provided with a circumferential row of outwardly projecting tread blocks of substantially the same area and so arranged that no successive blocks are of the same shape.

9. A tire for vehicle wheels having its central circumferential tread portion provided with outwardly projecting and spaced tread blocks of irregular shape and having substantially the same contact areas whereby the blocks will successively engage the road surface at irregular time intervals to decrease sound vibration as the tire is advanced over the road surface.

HALVER R. STRAIGHT.